United States Patent [19]

Boggs et al.

[11] Patent Number: 5,913,050

[45] Date of Patent: Jun. 15, 1999

[54] METHOD AND APPARATUS FOR PROVIDING ADDRESS-SIZE BACKWARD COMPATIBILITY IN A PROCESSOR USING SEGMENTED MEMORY

[75] Inventors: Darrell D. Boggs, Aloha; Robert P. Colwell, Portland; Michael A. Fetterman; Andrew F. Glew, both of Hillsboro; Glenn J. Hinton, Portland; David B. Papworth, Beavertown, all of Oreg.

[73] Assignee: Intel Corporation, Santa Clara, Calif.

[21] Appl. No.: 08/735,048

[22] Filed: Oct. 22, 1996

Related U.S. Application Data

[63] Continuation of application No. 08/175,103, Dec. 29, 1993.

[51] Int. Cl.$^6$ .............................. G06F 12/06; G06F 9/26
[52] U.S. Cl. .................................. 395/421.03; 395/421.1; 395/421.04; 395/421.07
[58] Field of Search ........................... 395/421.1, 421.04, 395/421.07, 421.03; 364/300, 411, 746

[56] References Cited

U.S. PATENT DOCUMENTS

| | | | |
|---|---|---|---|
| 5,027,273 | 6/1991 | Letwin | 395/411 |
| 5,129,068 | 7/1992 | Watanabe et al. | 395/421.04 |
| 5,150,471 | 9/1992 | Tipon et al. | 395/421.1 |
| 5,233,553 | 8/1993 | Shak et al. | 364/746 |
| 5,345,583 | 9/1994 | Davis | 395/182.21 |
| 5,390,310 | 2/1995 | Welland | 395/413 |
| 5,412,662 | 5/1995 | Honma et al. | 371/21.1 |
| 5,511,017 | 4/1996 | Cohen et al. | 364/746 |
| 5,561,788 | 10/1996 | Letwin | 395/500 |

OTHER PUBLICATIONS

*i486 Microprocessor PRogrammers Reference Manual*, Osborne–McGraw–Hill, Santa Clara, CA, 1990, pp. iii–xx, 1–1–1–9, 2–1–3–45, 5–1–5–25.

Johnson, Mike, *Superscalar Microprocessor Design*, Prentice Hall, Englewood Cliffs, N.J., 1991, pp. i–xxiii, 9–85, 127–146.

Yeh, Tse–Yu, and Yale N. Patt, "Alternative Implementations of Two–Level Adaptive Branch Prediction", The 19th Annual International Symposium on Computer Architecture, May 1992, pp. 124–134.

Yeh, Tse–Yu, and Yale N. Patt, "Two–Level Adaptive Training Branch Prediction", The 24th ACM/IEEE International Symposium and Workshop on MicroArchitecture, Nov. 1991, pp. 51–61.

V. Popescu, et al., "The Metaflow Architecture," IEEE Micro, pp. 10–13 and 63–73, Jun. 1991.

Intel, 386 DX Microprocessor Programmer's Reference Manual, Section 13–2 to 15–4, 1991.

*Primary Examiner*—David K. Moore
*Assistant Examiner*—Than V. Nguyen
*Attorney, Agent, or Firm*—Blakely, Sokoloff, Taylor & Zafman

[57] ABSTRACT

This invention overcomes the address size backward compatibility problem by first subtracting the segment base address from the linear destination address of a branch instruction to generate a virtual destination address. It is assumed that the branch instruction destination address is n bits long with m most significant bits. It is desired to provide backward compatibility in the n-bit processor for branch instruction code written for processors utilizing instruction address fields of size (n–m) bits. After obtaining the virtual address, if any of the m most significant bits are non-zero, then those m bits are set to zero to thereby generate a corrected virtual address. If such a compatibility correction is necessary, then a clear signal is asserted to flush all state of the processor that resulted from instructions being fetched after the branch instruction was fetched. The corrected virtual address is added back to the segment base address to generate a corrected linear address. The next instruction is fetched at the corrected linear address.

25 Claims, 9 Drawing Sheets

METHOD AND APPARATUS FOR PROVIDING ADDRESS-SIZE BACKWARD COMPATIBILITY IN A PROCESSOR USING SEGMENTED MEMORY

This is a continuation of application Ser. No. 08/175,103, filed Dec. 29, 1993.

BACKGROUND OF THE INVENTION

1. Field Of The Invention

The invention relates to the calculation of instruction addresses in a microprocessor, and more particularly, to providing backward compatibility for instruction code written for processors utilizing smaller instruction address fields.

2. Art Background

SPECULATIVE OUT OF ORDER PROCESSORS

Early microprocessors generally processed instructions one at a time. Each instruction was processed using four sequential stages: instruction fetch, instruction decode, execute, and result writeback. Within such microprocessors, different dedicated logic blocks performed each different processing stage. Each logic block waits until all the previous logic blocks complete operations before beginning its operation.

To improve microprocessor efficiency, microprocessor designers overlapped the operations of the fetch, decode, execute, and writeback stages such that the microprocessor operated on several instructions simultaneously. In operation, the fetch, decode, execute, and writeback stages concurrently process different instructions. At each clock cycle the results of each processing stage are passed to the following processing stage. Microprocessors that use the technique of overlapping the fetch, decode, execute, and writeback stages are known as "pipelined" microprocessors.

In order for pipelined microprocessors to operate efficiently, an instruction fetch unit at the head of the pipeline must continually provide the pipeline with a stream of instructions. However, conditional branch instructions within an instruction stream prevent an instruction fetch unit at the head of a pipeline from fetching the correct instructions until the condition is resolved. Since the condition will not be resolved until further down the pipeline, the instruction fetch unit cannot necessarily fetch the proper instructions.

To alleviate this problem, some newer pipelined microprocessors use branch prediction mechanisms that predict the outcome of branches, and then fetch subsequent instructions according to the branch prediction. Branch prediction is achieved using a branch target buffer (BTB) to store the history of a branch instruction based only upon the instruction pointer or address of that instruction. Every time a branch instruction is fetched, the BTB predicts the target address of the branch using the branch history. For a more detailed discussion of branch prediction, please refer to Tse Yu Yeh and Yale and Patt, *Two-Level Adaptive Branch Prediction*, the 24th ACM/IEEE International Symposium and Workshop on MicroArchitecture, November 1991, and Tse Yu Yeh and Yale N. Patt, *Alternative Implementations of Two-Level Adaptive Branch Prediction*, Proceedings of the Nineteenth International Symposium on Computer Architecture, May 1992.

In combination with speculative execution, out-of-order dispatch of instructions to the execution units results in a substantial increase in instruction throughput. With out-of-order completion, any number of instructions are allowed to be in execution in the execution units subject to the limitations imposed by various hardware buffers. Instructions may complete out of order because instruction dispatch is not stalled when a functional unit takes more than one cycle to compute a result. Consequently, a functional unit may complete an instruction after subsequent instructions have already completed.

In a processor using out-of-order completion, instruction dispatch is stalled when there is a conflict for a functional unit or when an issued instruction depends on a result that is not yet computed. In order to prevent or mitigate stalls in decoding, the prior art provides for a buffer known as a reservation station (RS) between the decode and execute stages. The processor decodes instructions and places them into the reservation station as long as there is room in the buffer, and at the same time, examines instructions in the reservation station to find those that can be dispatched to the execution units (that is, instructions for which source operands and execution units are available). Instructions are issued from the reservation station with little regard for their original program order. However, the capability to issue instructions out-of-order introduces a constraint on register usage. To understand this problem, consider the following pseudo-microcode sequence:

1. t←load (memory)
2. eax←add (eax, t)
3. ebx←add (ebx, eax)
4. eax←add (ecx, 2)
5. edx←add (eax, 3)

The micro-instructions and registers shown above are those of the well known Intel microprocessor architecture. For further information, reference may be made to the i486™ *Microprocessor Programmers Reference Manual*, published by Osborne-McGraw-Hill, 1990, which is also available directly from Intel Corporation of Santa Clara, Calif.

In an out-of-order machine executing these instructions, it is likely that the machine would complete execution of the fourth instruction before the second instruction, because the fourth add instruction may require only one clock cycle, while the load instruction and the immediately following add instruction may require a total of four clock cycles, for example. However, if the fourth instruction is executed before the second instruction, then the fourth instruction would probably incorrectly overwrite the first operand of the second instruction, leading to an incorrect result. Instead of the second instruction producing a value that the third instruction uses, the third instruction produces a value that destroys a value that the second one uses.

This type of dependency is called a storage conflict, because the reuse of storage locations (including registers) causes instructions to interfere with one another, even though the conflicting instructions are otherwise independent. Such storage conflicts constrain instruction dispatch and reduce performance.

It is known in the art that storage conflicts can be removed by providing additional registers that are used to reestablish the correspondence between registers and values. These additional "physical" registers are associated with the original "logical" registers and values specified by the program using register renaming. To implement register renaming, the processor typically allocates a new register for every new value produced, i.e., for every instruction that writes a register. An instruction identifying the original logical register for the purpose of reading its value obtains instead the value in the newly allocated physical register. Thus, the hardware renames the original register identifier in the instruction to identify the new register and the correct value. The same register identifier in several different instructions may access different hardware registers depending on the locations of register references with respect to the register assignments.

With renaming, the example instruction sequence depicted above becomes:

1. $t_a \leftarrow$ load (mem)
2. $eax_b \leftarrow$ add $(eax_a, t_a)$
3. $ebx_b \leftarrow$ add $(ebx_a, eax_b)$
4. $eax_c \leftarrow$ add $(ecx_a, 2)$
5. $edx_a \leftarrow$ add $(eax_c, 3)$ In this sequence, each assignment to a register creates a new instance of the register, denoted by an alphabetic subscript. The creation of a renamed register for eax in the fourth instruction avoids the resource dependency on the second and third instructions, and does not interfere with correctly supplying an operand to the fifth instruction. Renaming allows the fourth instruction to be dispatched immediately, whereas, without renaming, the instruction must be delayed until execution of the second and third instructions. When an instruction is decoded, its result value is assigned a location in a functional unit called a reorder buffer (ROB), and its destination register number is associated with this location. This renames the destination register to the reorder buffer location. When a subsequent instruction refers to the renamed destination register, in order to obtain the value considered to be stored in the register, this instruction obtains instead the value stored in the reorder buffer if that value has already been computed.

The use of register renaming in the ROB not only avoids register resource dependencies to permit out-of-order execution, but also plays a key role in speculative execution. If the instruction sequence given above is considered to be part of a predicted branch, then one can see that execution of those instructions using the renamed registers in the ROB has no effect on the actual logical registers denoted by instruction. Thus, if it is determined that the branch was mispredicted, the results calculated and stored in the ROB may be erased and the pipeline flushed without affecting the actual logical architectural registers found in the processor's register file (RF). If the predicted branch affected the values in the RF, then it would be difficult to recover from branch misprediction because it would be difficult to determine what values were stored in the architectural registers before the predicted branch was taken without the use of redundant registers in the ROB.

As instructions are executed, a given register may be written many times. Thus, different instructions may cause the same register number to be written into different entries of the ROB through renaming, because the instructions specify the same destination register. To obtain the correct value when this happens, multiple matching entries in the ROB are prioritized by order of allocation and the most recent entry is returned for use by subsequent instructions.

When a result is produced, it is written to the ROB. The result may provide an input operand to one or more waiting instructions buffered in the reservation station, freeing the instructions to be dispatched to one or more execution units. After the value is written into the ROB, subsequent instructions continue to fetch the value from the ROB, unless the entry is superseded by a new register assignment, until the value is retired by writing to the register file.

Retirement occurs in order of the original instruction sequence after execution of the instructions, and if the jump execution unit (JE), otherwise referred to as the branch unit, determines that the predicted branch is the correct branch. The JE makes this determination by evaluating either the destination target address for an unconditional branch or the conditions for a conditional branch, then comparing the result to the prediction. If the predicted path is correct, then the result stored in the ROB may be written to the register file. In this case, the register alias table updates its record-keeping to indicate the reassignment of the values to the register file.

If the branch is mispredicted, then the ROB entries that resulted from the execution of instructions in the mispredicted branch must be cleared along with all pipeline stages involved in the fetching, decoding, and execution of instructions subsequent to the branch misprediction. Conversely, the processor maintains the architectural state associated with instructions preceding the mispredicted branch. For a detailed explanation of speculative out-of-order execution, please refer to M. Johnson, *Superscalar Microprocessor Design*, Prentice Hall, 1991, Chapters 2,3,4, and 7.

ADDRESSING MODES

The location of an instruction is specified by its instruction pointer or IP. Instruction pointers in the Intel i8088™ and i286™ processors were expanded from 16 bits to 32 bits when Intel Corporation introduced the i386™ processor. Other companies similarly expanded the instruction pointers used by their processors when they introduced more powerful machines. Because of the expansion of the IP, in the more powerful processors the instruction pointer is referred to as an extended instruction pointer or EIP.

Branching in the Intel architecture microprocessor is generally performed using a relative address. Using relative addressing, the programmer directs program control to the destination EIP by specifying in the instruction the displacement necessary to reach the target EIP. In other words, the destination address is formed by adding the displacement to the address held in the EIP register. The EIP register then contains the address of the next instruction to be executed.

In 16 bit machines, there are $2^{16}$=64K memory locations for instructions. If, for example, during the execution of instructions, the processor encounters the instruction JUMP 5K at EIP 62K, then the processor would calculate a target address of 62K+5K=67K. Because this address would exceed the address space of the 16 bit processor, the target EIP is truncated at the sixteenth bit resulting in a modulo 64K result of 3K. This phenomena is known as "wrap-around" and is accounted for by programmers when writing branching instructions.

Because of the enormous volume of software written for 16 bit machines that is still in use, the newer, more powerful 32 bit processors must be made backwardly compatible with the 16 bit code. One solution to this problem would be to disable the carry between the adders for the calculation of the 16th and 17th bits 6f the target address in the branch execution unit. This would ensure that the target instruction pointer of the branch instruction is a modulo 64K number exhibiting 16 bit wraparound. Thus the result would be identical to that found using a 16 bit machine. However, this solution is not sufficient or practical in the context of some Intel microprocessor architecture implementations and similar architecture implementations because those architectures utilize segmented memory management.

Under the segmented model, memory is segmented into multiple, independent address spaces. The beginning of each segment is specified by a segment base address, and the location within each segment is indicated by a displacement. The addresses specified in program code by the assembly language programmer are denoted "virtual addresses", which are treated as the offset into the segment. Segmentation hardware translates the virtual address into the address in the segment called the "linear address" by adding the segment base to the virtual address.

A processor utilizing segmented memory needs a linear instruction pointer to fetch instructions from segmented memory. The base address in 32 bit processors such as the i386™ and i486™ machines is 32 bits wide. This base address is added to the EIP to obtain a 32 bit linear EIP. When attempting to execute a branch instruction written for a 16 bit machine, the 32 bit machine will add a 16 bit displacement specified by the instruction to the current 32 bit linear EIP without 16 bit wraparound. As a result, this instruction could lead to a wholly unintended target address. Moreover, in this case, disabling the carry from the 16th bit of the adder would not yield a correct destination because the 32 bit base address makes the upper 16 bits of the resultant instruction pointer critical to calculating the correct target linear EIP.

For example, assume that the base address is 100K and the instruction JUMP 5K is encountered at EIP=62K. In this case, the linear EIP=base+virtual EIP=100K+62K=162K. The execution unit will calculate the target address of the jump instruction as 162K+5K=167K. This is incorrect because the destination EIP should be base+((virtual IP+displacement) mod 64K)=100K+(67K mod 64K)= 100K+3K=103K.

It is desirable to provide a means whereby a processor using segmented memory management may be made backwardly compatible with code written for processors utilizing a smaller instruction address field.

SUMMARY OF THE INVENTION

This invention overcomes the address size backward compatibility problem by first subtracting the segment base address from the linear destination address of a branch instruction to generate a virtual destination address. It is assumed that the branch instruction destination address is n bits long with m most significant bits. It is desired to provide backward compatibility in the n-bit processor for branch instruction code written for processors utilizing instruction address fields of size (n−m) bits. After obtaining the virtual address, if any of the m most significant bits are non-zero, then those m bits are set to zero to thereby generate a corrected virtual address. If such a compatibility correction is necessary, then a clear signal is asserted to flush all state of the processor that resulted from instructions being fetched after the branch instruction was fetched. The corrected virtual address is added back to the segment base address to generate a corrected linear address. The next instruction is fetched at the corrected linear address.

BRIEF DESCRIPTION OF THE DRAWINGS

The objects, features and advantages of the present invention will be apparent to one skilled in the art in light of the following detailed description in which.

DETAILED DESCRIPTION OF THE INVENTION

In an n-bit processor using segmented memory management, the present invention provides a method and apparatus for providing backward compatibility for instruction code written for processors utilizing smaller instruction address fields. For purposes of explanation, specific embodiments are set forth to provide a thorough understanding of the present invention. However, it will be apparent to one skilled in the art that the invention may be practiced without these details. In other instances, well known elements, devices, process steps and the like are not set forth in detail in order to avoid unnecessarily obscuring the present invention.

The present invention provides two related solutions to solving the backward compatibility problem. At two different points along the processing path, the present invention obtains the virtual address from the linear address and determines whether any of the upper 16 bits are non-zero (The "upper" m bits refer to the m most significant bits herein.) If so, the processor will clear the upper 16 bits of the instruction pointer, and add back the segment base address. The processor will then flush the pipeline to clear all processor state that resulted from operations using the incorrect EIP. The correct linear EIP will then be transferred back to the instruction fetch unit to enable processing with the resulting EIP exhibiting 16 bit wraparound.

Figure 1:
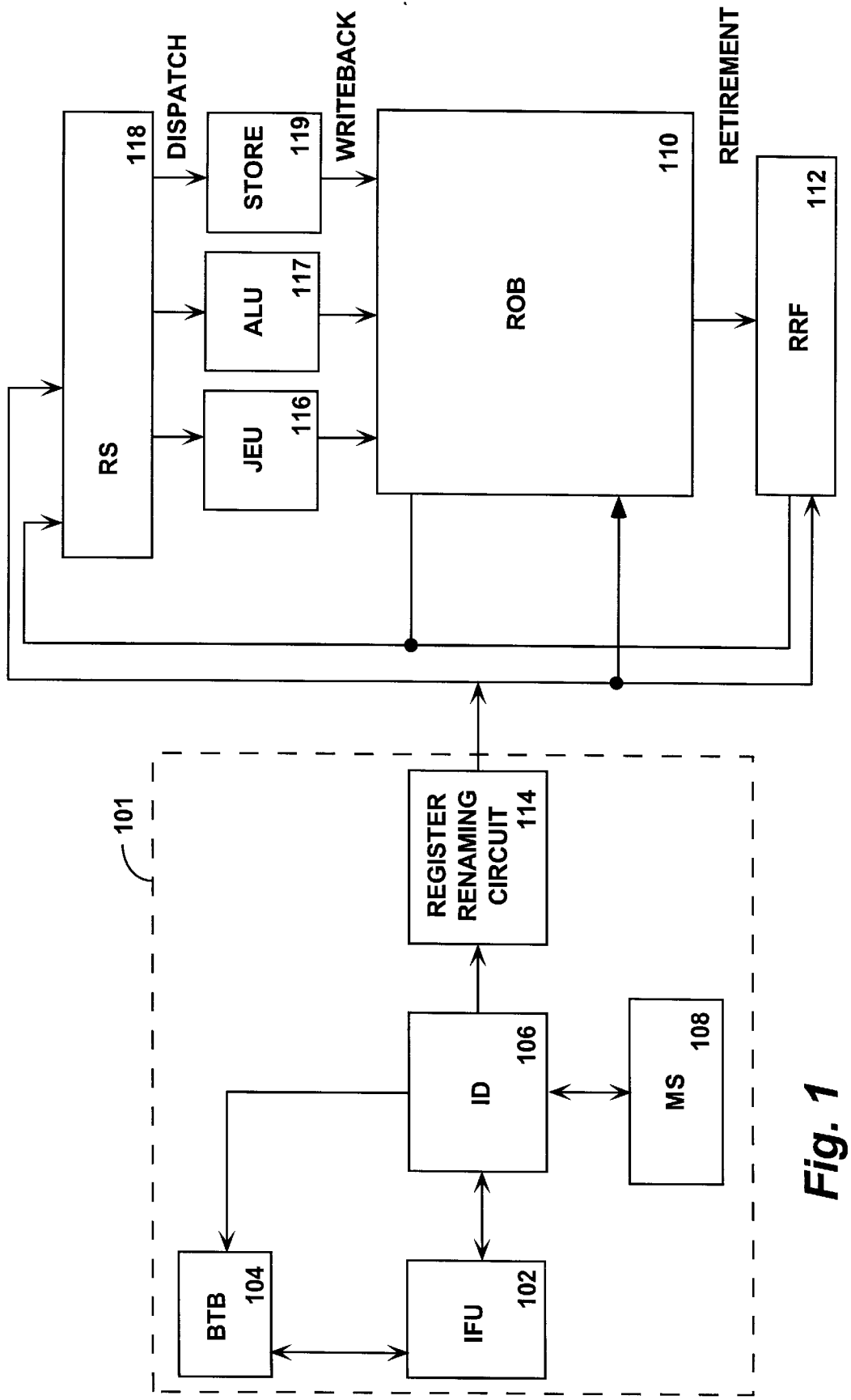
FIG. 1 is a block diagram of a speculative out-of-order processor, such as that used in the present invention.

FIG. 1 is a block diagram of a speculative out-of-order processor, such as that used in one embodiment of the present invention. The processor comprises an instruction fetch unit (IFU) 102 coupled to a branch target buffer (BTB) 104 and an instruction decoder (ID) 106. The IFU 102 fetches instructions based upon the instruction pointer proved by the BTB 104. Those instructions are decoded by the ID 106 into micro-instructions or micro-operations (uops) with the help of an optional micro-instruction sequencer (MS) 108. The MS uses well-known lookup table techniques to translate complex instructions into their corresponding micro-instructions. Such complex instructions are of the type found in Intel microprocessor architecture and similar architectures.

A register renaming circuit 114 renames the logical destination register addresses specified by a received uop to correspond to physical destination register addresses. The physical register addresses are addresses that index storage locations in the reorder buffer (ROB) 110. The contents of a ROB register are retired to a location in a real register file (RRF) 112. The mapping of a logical destination address (specified by an instruction) to a physical entry in the ROB is maintained in the register renaming circuit 114. The register renaming circuit 114 also stores a real register file valid bit (RRFV) that indicates whether the value indicated by the logical address is to be found at the physical address in the ROB 110 or in the real register file 112 after retirement. Based upon this mapping, the register renaming circuit 114 also associates every logical source address to a corresponding location in the ROB or the RRF (the source operand of one instruction generally must have been the destination of a previous instruction).

The register renaming circuit 114 also assigns each incoming uop to an entry in the reservation station (RS) 118. The RS 118 buffers the uops waiting to be executed by the execution units 116, 117 and 119.

Rob Solution

In one embodiment, only the linear and not the virtual EIP is maintained in the front end 101 of the processor (in the IFU and BTB sections). Using the virtual EIP and adding the base each instruction cycle to obtain the linear EIP would cost silicon area that this invention renders unnecessary. By maintaining the linear EIP, the addition of the base to the virtual EIP is never performed in the front end, thus reducing hardware complexity and the number of calculations performed each cycle. These features reduce both chip power consumption and area.

Although the front end of the processor of this embodiment does not maintain virtual IPs, the instruction set of the popular Intel architecture microprocessor and similar microprocessor designs include a number of instructions requiring virtual addresses. Thus, at some point in the processing path, it would be convenient for the processor to recalculate the virtual EIP for the execution of certain instructions. For example, a CALL instruction saves the address of the instruction following the CALL instruction for later use by a RET (return) instruction. To do so, CALL pushes the current contents of the EIP register onto a stack. The return instruction in the CALL procedure uses this address to transfer execution back to the calling program. The EIP register used by the CALL and RET instructions is defined to be a virtual address in the microprocessor architecture used by Intel Corporation and other microprocessor producers.

Figure 2:
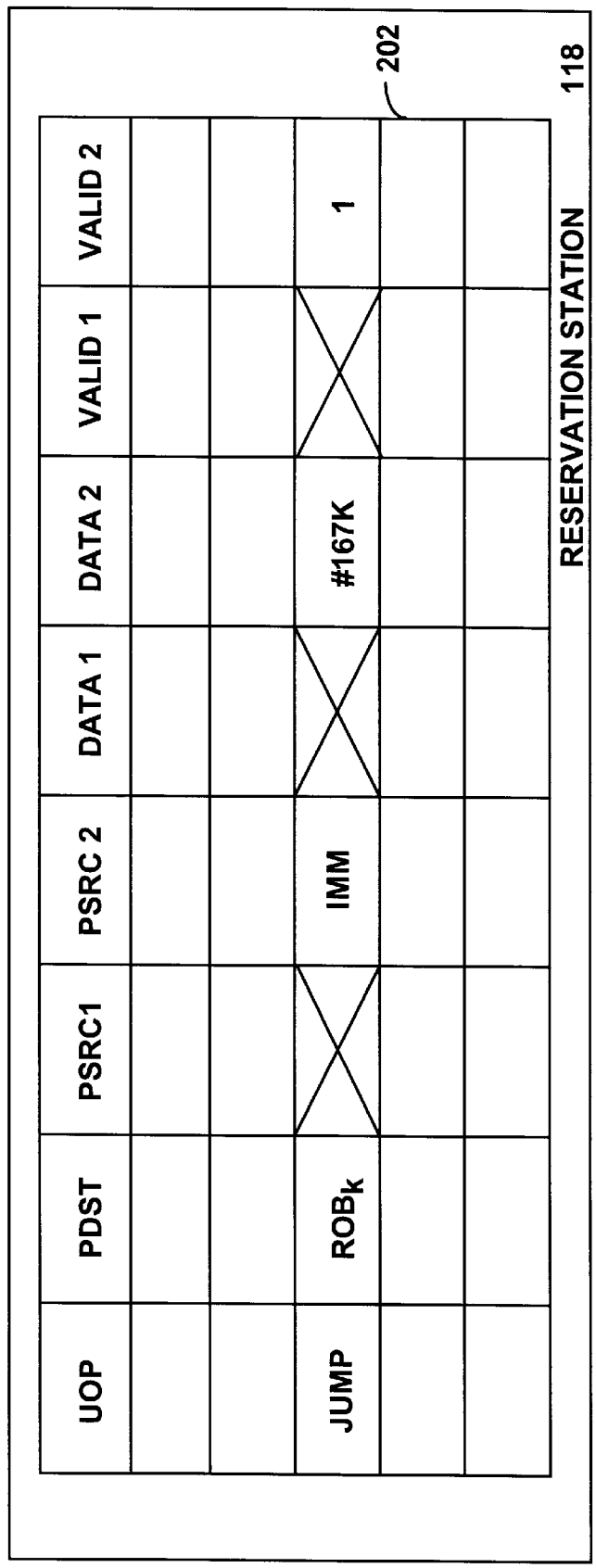
FIG. 2 illustrates a reservation station with an entry representing a branch instruction.

FIG. 2 illustrates the reservation station buffer 202. The RS entry for the instruction JUMP 5K is shown. The columns in the reservation station represent the micro-operation to be dispatched (UOP), the physical destination address of the result (PDST), the first physical source address (PSRC1), the second physical source address (PSRC2), the data associated with PSRC1 (DATA 1), the data associated with PSRC2 (DATA 2), and first and second valid bits (VALID 1 and VALID 2, respectively). PDST specifies the ROB entry designated to hold the speculative result of the instruction. PSRC1 and PSRC2 are the locations in the ROB where source operands DATA 1 and DATA 2, respectively, are to be found. VALID 1 and VALID 2 are valid bits indicating that source operands DATA 1 and DATA 2 are available to the reservation station 118.

In this example, the result of the JUMP instruction is to be stored at ROB entry $ROB_k$. For this instruction, PSRC 1 and DATA 1 need not be specified. An immediate indicator is stored as PSRC 2 to indicate that the data field DATA 2 itself contains the operand required for the jump instruction. During the decode stage, the instruction decoder 106 inserts the linear target address into the micro-operation that is sent to the reservation station 118. This linear target address of the JUMP instruction=segment base+current EIP+displacement=100K+62K+5K=167K, assuming the current EIP is 62K.

Figure 3:
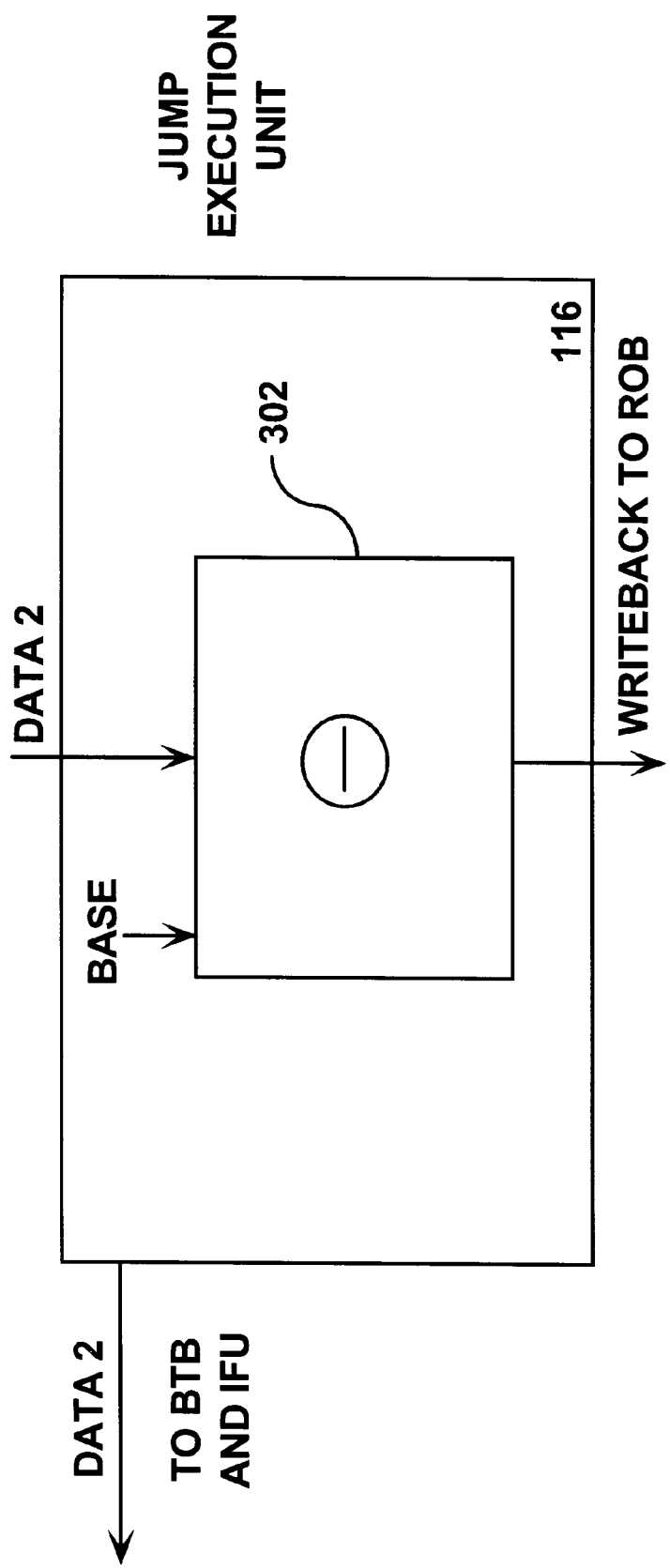
FIG. 3 is a block diagram of a jump execution unit of the present invention.

FIG. 3 illustrates the jump execution unit 116. Upon dispatch, the reservation station 118 dispatches the JUMP instruction to the jump execution unit 116 for execution. In this embodiment of the present invention, the jump execution unit 116 includes a subtractor 302 for subtracting the segment base from the linear target address specified in the DATA 2 entry. The result is a virtual target address=167K−100K=67K. This result is written by the jump execution unit 116 into the ROB memory 402 of ROB 110 as shown in FIG. 4.

Figure 4:
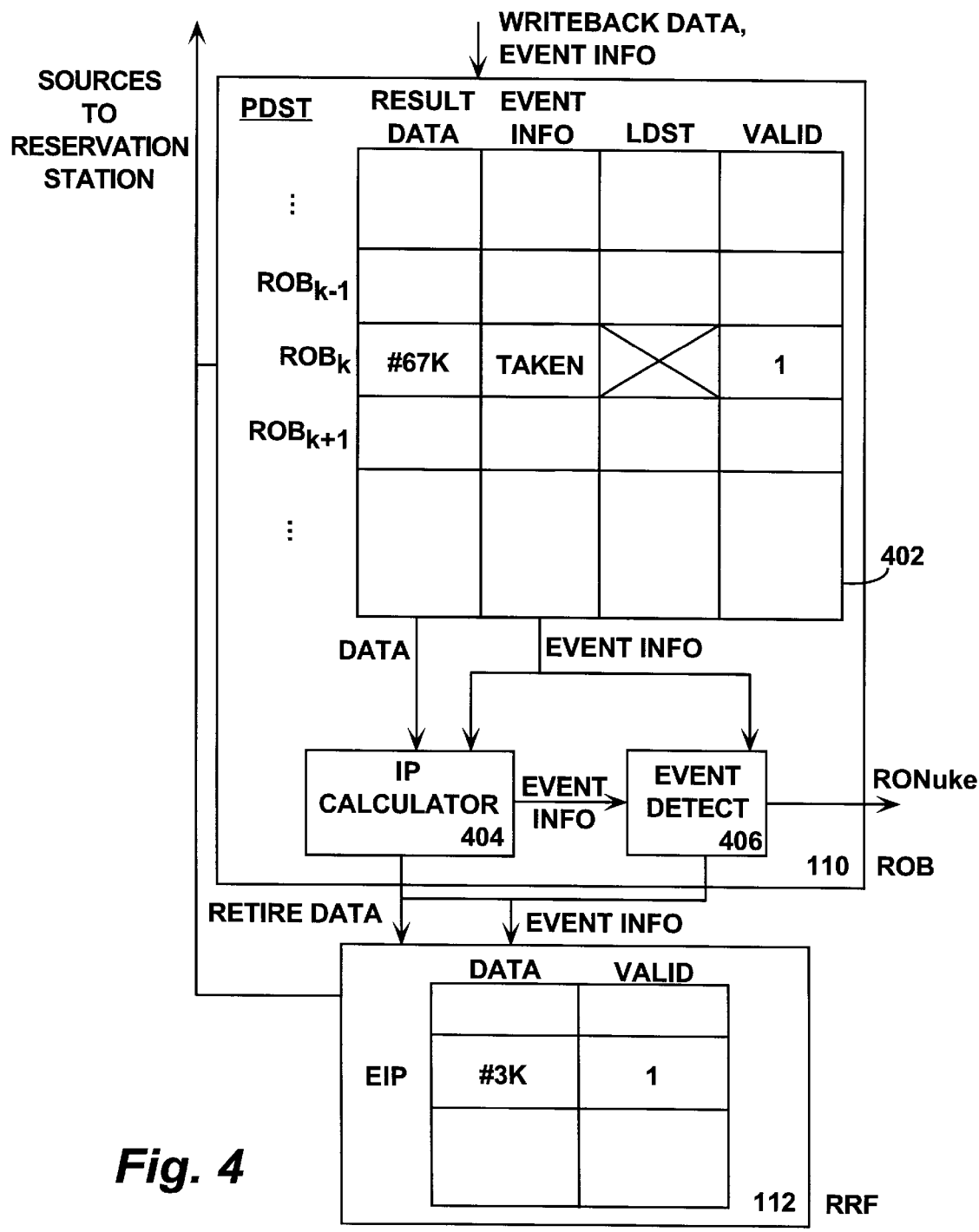
FIG. 4 illustrates a reorder buffer and register file of the present invention.

FIG. 4 illustrates the ROB 110 and the real register file 112. The ROB memory 402 is addressed by the PDST, and contains the result of the execution of the instruction, event information, LDST, and a valid bit. The EVENT INFO field includes fault information and the valid bit indicates that the instruction is ready for retirement. In this example, the EVENT INFO field indicates that the branch indicated by the JUMP instruction is taken, as will always be the case for an unconditional jump. At retirement, the target address for the jump instruction is transferred to an instruction pointer calculator 404.

Figure 5:
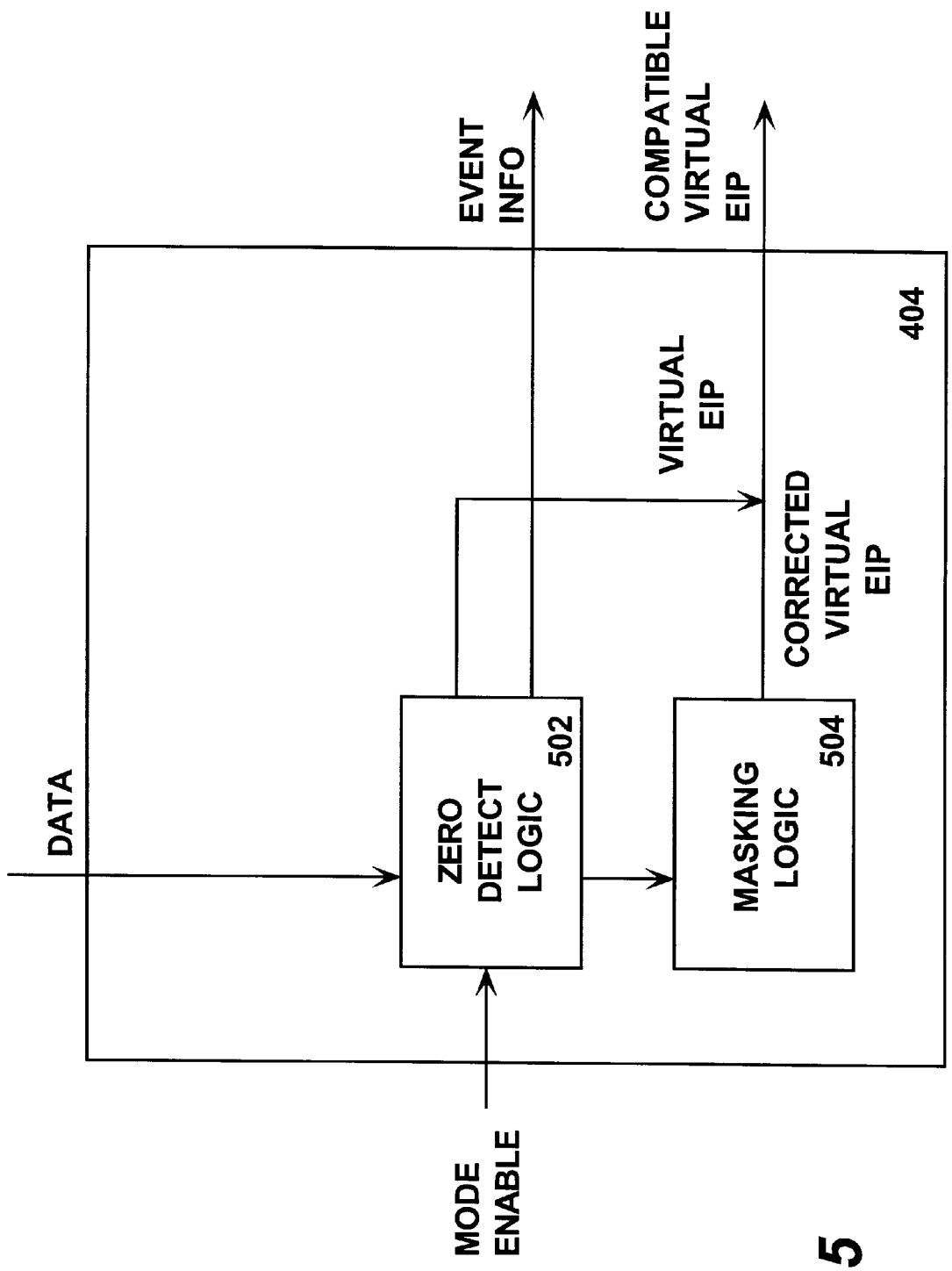
FIG. 5 illustrates an instruction pointer calculator of one embodiment of the present invention.

The instruction pointer calculator is shown in greater detail in FIG. 5. Among other functional units, the instruction pointer calculator 404 includes zero detect logic 502, and masking logic 504. In this embodiment, a mode enable input indicates whether the processor is operating with code written for 16 or 32 bit processors. The mode enable bit is well defined in existing computer architectures and is easily accessible. See, e.g., the i486™ *Programmers Reference Manual*.

The mode enable signal enables the zero detect logic 502 for operation in compatibility mode when the processor is executing 16 bit code. When enabled, the zero detect logic 502 examines the upper sixteen bits of the 32 bit virtual EIP from the $ROB_k$ entry of the ROB memory 402 to determine whether the upper sixteen bits are non-zero. If the upper sixteen bits are all zeroes, then wrap-around correction is unnecessary. In that case, the zero detect logic forwards the virtual EIP to the RRF 112. If, however, the zero detect logic determines that one or more of the sixteen most significant bits are non-zero, then the 32 bit virtual bit EIP is transferred to the masking logic unit 504. The masking logic unit 504 clears the upper sixteen bits to produce a corrected virtual EIP, which is later committed to the EIP register in the RRF 112. In this case, zero detect logic 502 also sends fault event information to event detect logic 406 of the ROB 110.

Figure 6:
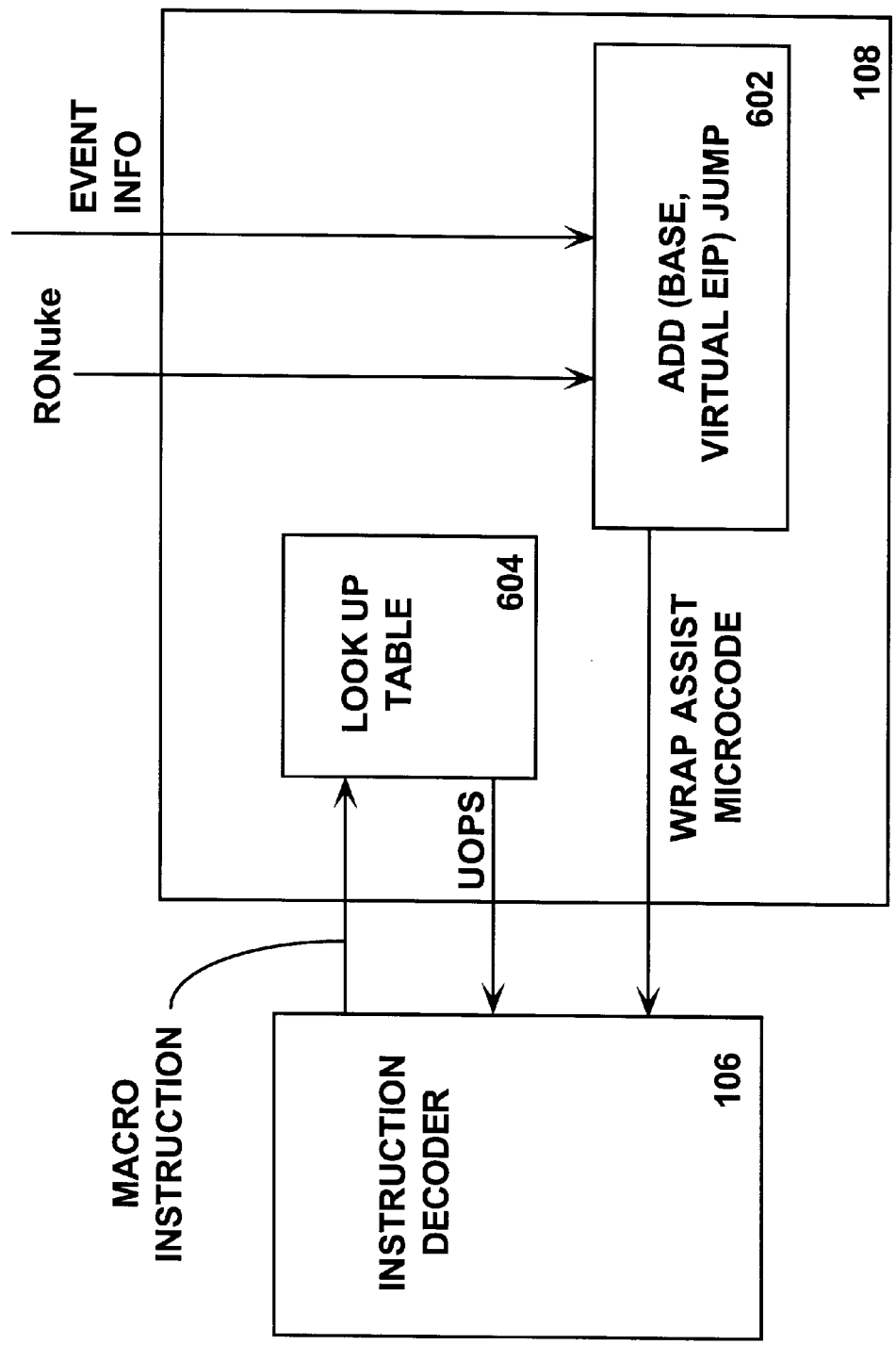
FIG. 6 illustrates an instruction decoder and microinstruction sequencer of one embodiment of the present invention.

FIG. 6 illustrates the ID 106 and MS 108 in greater detail. In response to the fault signal, the event detect unit 406 (FIG. 4) will issue an RONuke signal. The RONuke signal flushes all stages of the pipeline of all calculations performed after the branch instruction leading to the compatibility fault. The RONuke signal also triggers execution of a wrap assist handler 602, which may be found in the microinstruction sequencer 108. In normal operation, microinstruction sequencer 108 includes a lookup table 604, which provides micro-operations in response to receipt of complex macro-instructions from instruction decoder 106. When the wrap assist handler 602 receives the RONuke signal, it issues microcode to the instruction decoder 106, which passes the microcode down the pipeline for execution as usual. The wrap assist microcode includes an add microinstruction for adding the segment base to the corrected virtual EIP calculated by the masking logic 504, and a jump instruction for setting the linear EIP to that result, i.e., jumping to the resultant instruction pointer so that program control is restarted at the correct instruction. In this example, the corrected linear EIP=(DATA2−segment base) mod 64K+ segment base=(167K−100K) mod 64K+100K=67K mod 64K+100K=3K+100K=103K. This result is the target address of the jump executed in the wrap assist handler 602. Upon retirement of that jump instruction, the virtual result computed previously, 3K, is stored in the real register file 112, as shown in FIG. 4.

The preceding discussion used the example of an unconditional branch instruction. The same considerations of course apply to a conditional branch instruction after the jump execution unit has evaluated the conditions and determined that the branch is to be taken. If the branch is not taken, then the instruction pointer is merely incremented to point to the branch fall-through instruction. In that case, backward compatibility of the nature handled by the present invention is not a problem.

Instruction Decoder Solution

Figure 7:
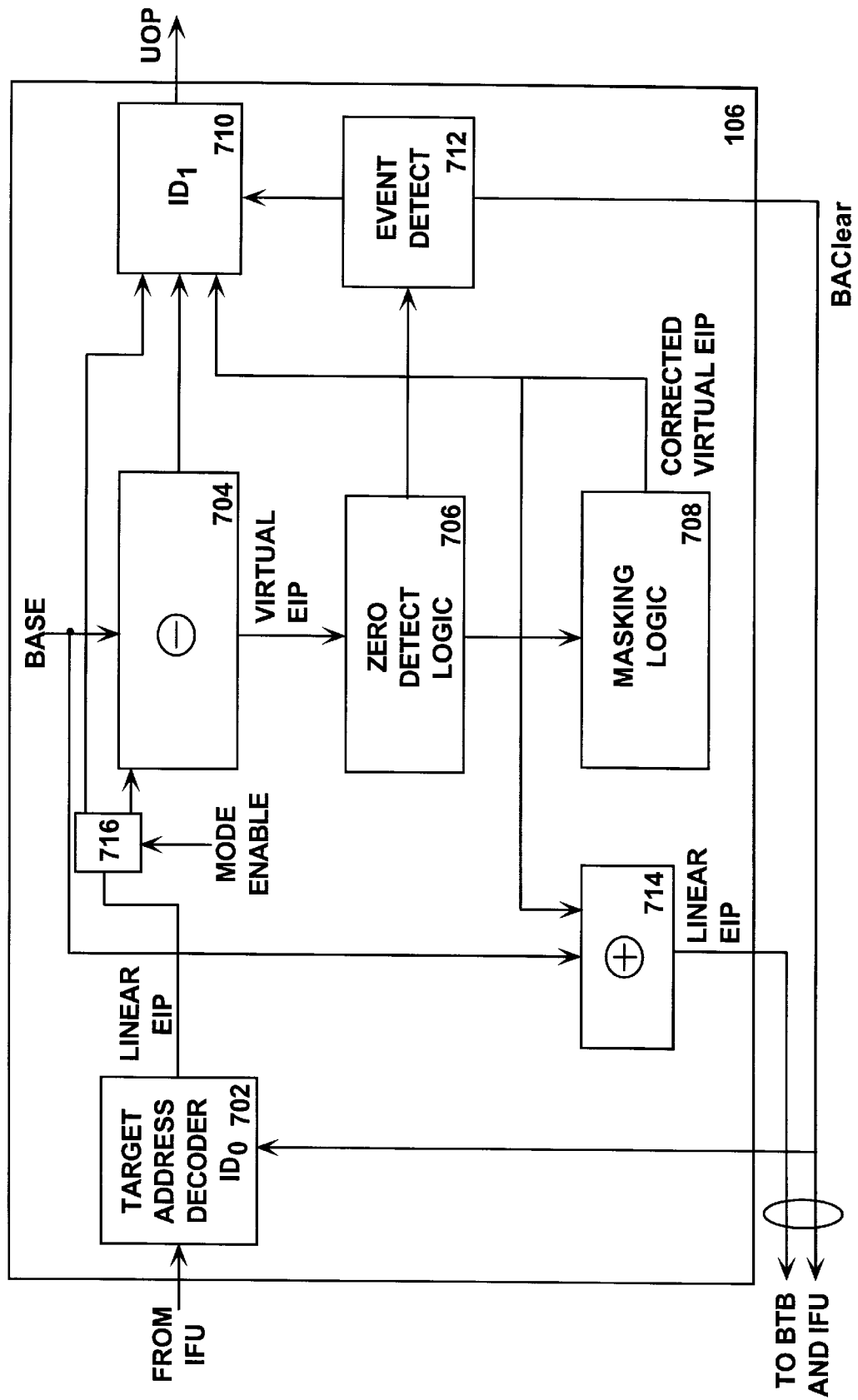
FIG. 7 illustrates an instruction decoder of an alternate embodiment of the present invention.

A second embodiment of the present invention corrects for compatibility earlier in the pipeline, but requires more hardware to achieve backward compatibility. In this embodiment, hardware in the instruction decoder 106 is used to translate the linear EIP to the virtual EIP. As shown in FIG. 7, a target address decoder 702 extracts the linear EIP of the branch destination from the instruction fetch unit 102. A subtractor 704 subtracts the segment base from this target linear EIP, and feeds the result to zero detect logic 706, which performs essentially the same function as zero detect logic 502 in the instruction pointer calculator 404. The mode enable input controls a 1:2 multiplexer 716 which feeds the linear EIP to the subtractor 704 when in compatibility mode. Otherwise, the linear EIP is passed on to the second stage of the decoder ID1 710.

If zero detect logic 706 determines that the sixteen most significant bits of the virtual EIP are zero, then the result is forwarded to ID1 710, the second stage of the instruction decoder 106. ID1 710 inserts the target virtual instruction pointer into the micro-operation, which is transferred out of the instruction decoder 106 down the pipeline.

On the other hand, if the zero detect logic 706 determines that the sixteen most significant bits of the resultant virtual target EIP are not all zero, then the zero detect logic 706 transfers the result to masking logic 708, which clears the upper sixteen bits to form a corrected virtual EIP.

The zero detect logic 706 also indicates a compatibility fault to the event detect unit 712, which issues a branch address clear (BAClear) signal to the BTB 104, IFU 102 and the first stage 702 of the instruction decoder 106. The BAClear signal flushes those units of the pipeline of all calculations performed after fetching of the incorrect branch instruction. It should be noted that both the RONuke and BAClear signals may find a more general use in resetting the state of the processor in the case of branch mispredictions, faults, traps, etc.

The corrected linear EIP is calculated in a linear address calculator 714. The corrected linear IP is transferred to the BTB and IFU to restart program flow at the correct instruction address. Thus, this embodiment does not require the wraparound handling code of the previous embodiment.

By placing the compatibility hardware in the front end of the machine in the instruction decoder 106, this embodiment eliminates the need for the wraparound handler and requires the flushing of far fewer pipe stages. Rather than throwing away the results of calculations in both the in-order and out-of-order sections of the machine, this method only flushes the BTB, the IFU and a portion of the instruction decoder. This results in faster correction of the compatibility problem and an increase in instruction throughput. Note that the instruction decoder solution may be implemented in in-order and out-of-order processors, whether speculative or not.

Figure 8:
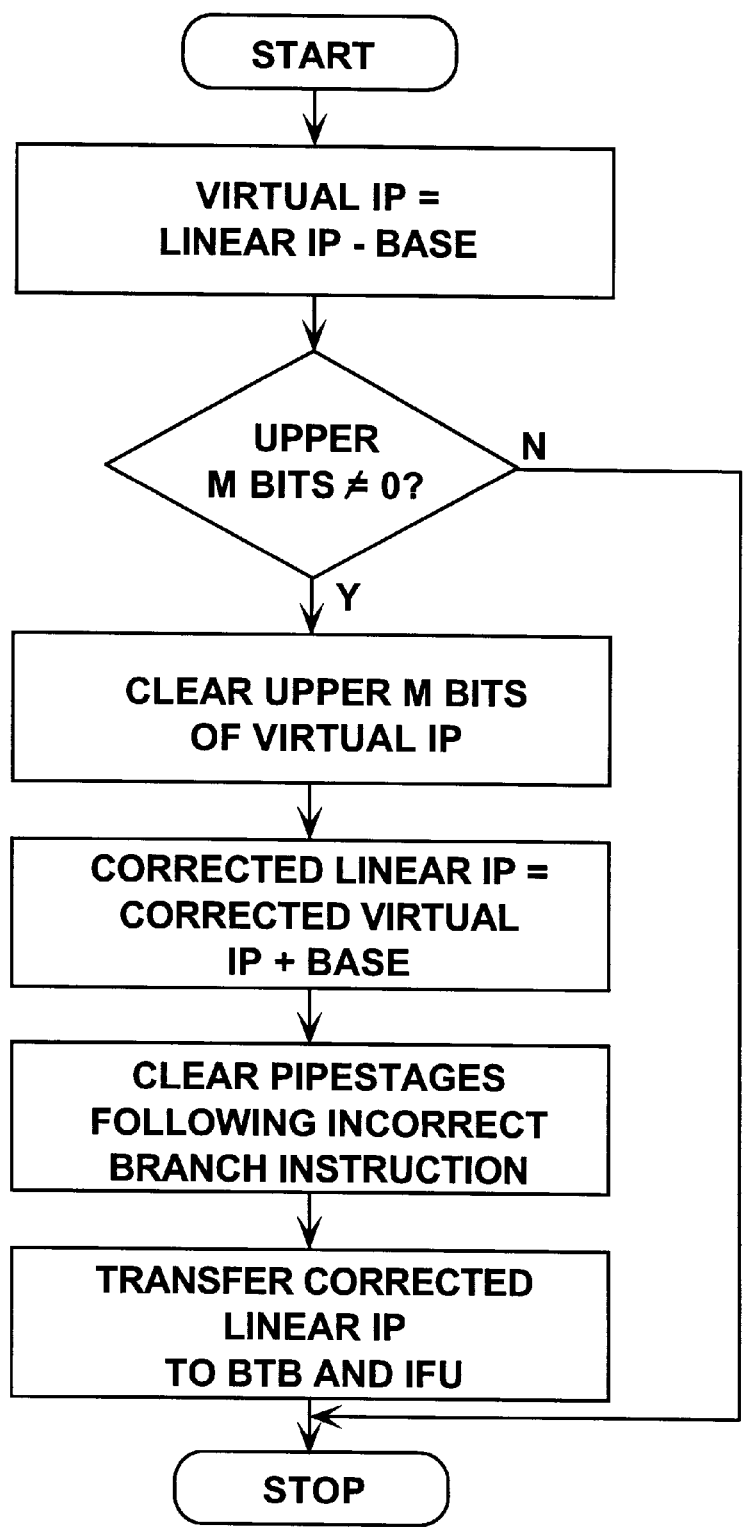
FIG. 8 is a flowchart of the method of the present invention.
Figure 9:
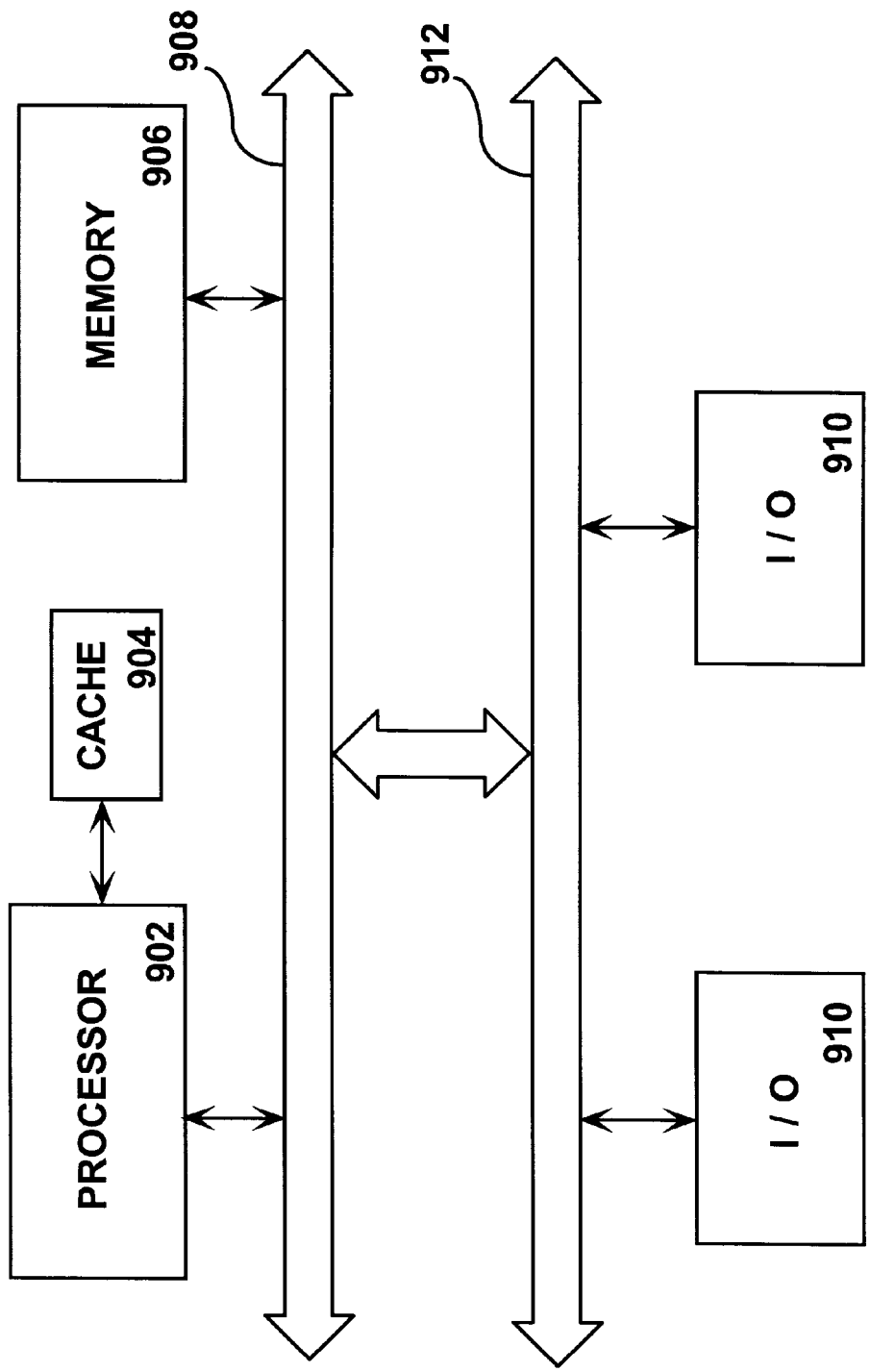
FIG. 9 illustrates the processor of the present invention in the context of a computer system.

FIG. 8 is a flow chart of the method of the present invention. FIG. 9 is a computer system incorporating the processor 902 of the present invention. The processor 902 is coupled directly to a cache 904. The processor 902 is also coupled to a memory 906 over a host bus 908 and to various input/output devices 910 over an I/O expansion bus 912.

It will be appreciated that various modifications and alterations might be made by those skilled in the art without departing from the spirit and scope of the present invention. In particular, the present invention provides compatibility for instruction addresses of any bit length—the invention is not limited to 32 bit machines running 16 bit codes. Further, the present invention may be implemented in a wide variety of in-order and out-of-order processors and emulators, whether speculative or not, and is not limited to processors using the Intel architecture. Moreover, the present invention may be physically embodied in a variety of packages. The present invention may be built into one integrated circuit package or have its functionality spread over a number of chips. In addition, the invention may be constructed on chips of different materials, such as silicon or gallium arsenide. The invention should, therefore, be measured in terms of the claims which follow.

We claim:

1. A method in a processor coupled to a memory, wherein the memory stores instructions according to a segmented memory configuration, wherein the processor includes an instruction fetch unit to fetch a branch instruction from the memory, wherein the branch instruction is associated with an n-bit linear destination address having m most significant bits, the method for providing compatibility in the processor for branch instruction code written for processors using instruction address fields of size (n−m) bits, the method comprising the steps of:

subtracting a segment base address from the linear destination address to generate a virtual address corresponding to the branch instruction;

setting the m most significant bits of the virtual address to zero, if any of the m most significant bits of the virtual address are nonzero, to thereby generate a corrected virtual address;

adding the corrected virtual address to the segment base address to thereby generate a corrected linear address; and fetching a next instruction at the corrected linear address.

2. The method of claim 1, further comprising the step of:

asserting a clear signal in response to any of the m most significant bits of the virtual address being nonzero, the clear signal flushing all state of the processor resulting from instructions fetched after fetching the branch instruction.

3. The method of claim 1, further comprising the steps of:

generating a compatibility fault signal if any of the m most significant bits of the virtual address are nonzero, wherein said setting step is performed in response to said compatibility fault signal.

4. The method of claim 2, further comprising the steps of:

generating a compatibility fault signal if any of the m most significant bits of the virtual address are nonzero, wherein said setting and asserting steps are performed in response to said compatibility fault signal.

5. A compatibility logic circuit in a processor, the processor being coupled to a memory, the memory to store instructions according to a segmented memory configuration, the instructions including a branch instruction, the branch instruction having a linear destination address, the compatibility logic circuit comprising:

a subtractor to subtract a segment base address from the linear destination address to generate a virtual address, the virtual address having m most significant bits;

masking logic to generate a corrected virtual address by setting the m most significant bits of the virtual address to zero if any of the m most significant bits of the virtual address are nonzero; and an adder to add the corrected virtual address to the segment base address to generate a corrected linear address from which a next instruction is to be fetched.

6. The compatibility logic circuit of claim 5, further comprising:

zero detect logic to generate a compatibility fault signal if any of the m most significant bits of the virtual address are nonzero, wherein the masking logic is capable of generating the corrected virtual address in response to the compatibility fault signal.

7. The compatibility logic circuit of claim 5, the processor including an instruction fetch unit to fetch instructions including the branch instruction from the memory, the compatibility logic circuit further comprising:

event detect logic to assert a clear signal if any of the m most significant bits of the virtual address are nonzero, the clear signal to flush the processor of all state resulting from instructions fetched after fetching the branch instruction.

8. The compatibility logic circuit of claim 7, wherein the adder is coupled to transfer the corrected linear address to the instruction fetch unit, the instruction fetch unit to fetch the next instruction at the corrected linear address.

9. The compatibility logic circuit of claim 7, wherein the clear signal is to clear the instruction fetch unit.

10. A processor coupled to a memory to store instructions according to a segmented memory configuration, the processor including an instruction fetch unit to fetch at least one branch instruction from the memory, the at least one branch instruction being associated with a linear destination address, the processor comprising:

a branch execution unit to execute the at least one branch instruction, the branch execution unit including a subtractor to subtract a segment base address from the linear destination address to thereby generate a virtual address, the virtual address having m most significant bits; and a reorder buffer including a plurality of physical registers to buffer speculative execution results, one of the physical registers to buffer the virtual address, the reorder buffer further including an instruction pointer calculator to calculate an instruction pointer of a next instruction upon retirement of the at least one branch instruction, the instruction pointer calculator including, masking logic to generate a corrected virtual address by setting the m most significant bits of the virtual address to zero if any of the m most significant bits of the virtual address are nonzero.

11. The processor of claim 10, further comprising:

zero detect logic to determine whether any of the m most significant bits of the virtual address are nonzero, and to generate a compatibility fault signal if any of the m most significant bits of the virtual address are nonzero, wherein the masking logic is capable of generating the corrected virtual address in response to the compatibility fault signal.

12. The processor of claim 11, the reorder buffer further including event detect logic to assert a clear signal in response to the compatibility fault signal, the clear signal to flush all state of the processor resulting from instructions fetched by the instruction fetch unit after fetching the at least one branch instruction.

13. The processor of claim 12, further comprising:

a wrap assist handler, responsive to the compatibility fault signal, to add the corrected virtual address to the segment base address to thereby generate a corrected linear address, and to jump to the corrected linear address.

14. The processor of claim 13, further comprising a real register file including a plurality of committed state registers to buffer committed execution results, the plurality of committed state registers including a committed instruction pointer register, the real register file to buffer the corrected virtual address in the committed instruction pointer register upon retirement of a microcode jump instruction issued by the wrap assist handler to jump to the corrected linear address.

15. A computer system comprising:

a bus to communicate information;

a memory storage device, coupled to the bus, to store instructions and data in a segmented memory configuration, the instructions including at least one branch instruction, the at least one branch instruction including a first branch instruction associated with an n-bit linear destination address, the first branch instruction being part of an instruction set written for processors utilizing instruction address fields of size (n–m) bits; and a processor, coupled to the bus, including a compatibility logic circuit, wherein the compatibility logic circuit includes, a subtractor to subtract a segment base address from the linear destination address to thereby generate a virtual address, the virtual address having m most significant bits, masking logic to generate a corrected virtual address by setting the m most significant bits of the virtual address to zero if any of the m most significant bits of the virtual address are nonzero; and an adder to add the corrected virtual address to the segment base address to generate a corrected linear address.

16. The computer system of claim 15, further comprising:

zero detect logic to generate a compatibility fault signal if any of the m most significant bits of the virtual address are nonzero, wherein the masking logic is capable of generating the corrected virtual address in response to the compatibility fault signal.

17. The computer system of claim 15, the processor including an instruction fetch unit to fetch instructions including the at least one branch instruction from the memory storage device, the compatibility logic circuit further comprising:

event detect logic to assert a clear signal if any of the m most significant bits of the virtual address are nonzero, the clear signal to flush the processor of all state resulting from instructions fetched by the instruction fetch unit after fetching the first branch instruction.

18. The computer system of claim 17, wherein the adder is coupled to transfer the corrected linear address to the instruction fetch unit, the instruction fetch unit to fetch a next instruction at the corrected linear address.

19. The computer system of claim 15, the processor further including a decoder to decode the at least one branch instruction, wherein the decoder includes the compatibility logic circuit.

20. The computer system of claim 18, the processor further including a decoder to decode the at least one branch instruction, wherein the decoder includes the compatibility logic circuit.

21. The computer system of claim 15, the processor further comprising:

a branch execution unit to execute the first branch instruction, the branch execution unit including the subtractor; and a reorder buffer comprising a plurality of physical registers to buffer speculative execution results, one of the physical registers to buffer the virtual address, the reorder buffer including an instruction pointer calculator to calculate an instruction pointer of a next instruction upon retirement of the first branch instruction, the instruction pointer calculator including the masking logic.

22. The computer system of claim 21, the processor further comprising:

zero detect logic to determine whether any of the m most significant bits of the virtual address are nonzero, and to generate a compatibility fault signal if any of the m most significant bits of the virtual address are nonzero, wherein the masking logic is capable of generating the corrected virtual address in response to the compatibility fault signal.

23. The computer system of claim 22, the processor further comprising an instruction fetch unit to fetch at least one instruction from the memory storage device;

the reorder buffer further including event detect logic to assert a clear signal in response to the compatibility fault signal, the clear signal to flush all state of the processor resulting from instructions fetched by the instruction fetch unit after fetching the first branch instruction.

24. The computer system of claim 23, the processor further comprising:

a wrap assist handler, responsive to the compatibility fault signal, to add the corrected virtual address to the segment base address to thereby generate the corrected linear address, and to jump to the corrected linear address.

25. The computer system of claim 24, the processor further comprising a real register file comprising a plurality of committed state registers to buffer committed execution results, the committed state registers including a committed instruction pointer register, the real register file to buffer the corrected virtual address in the committed instruction pointer register upon retirement of a microcode jump instruction issued by the wrap assist handler to jump to the corrected linear address.

* * * * *